United States Patent
Okamoto et al.

(10) Patent No.: US 12,455,852 B2
(45) Date of Patent: Oct. 28, 2025

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventors: Takuya Okamoto, Yokohama (JP); Toshiyuki Komoda, Yokohama (JP); Maiko Sekiguchi, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 454 days.

(21) Appl. No.: 17/867,988

(22) Filed: Jul. 19, 2022

(65) Prior Publication Data

US 2023/0222088 A1     Jul. 13, 2023

(30) Foreign Application Priority Data

Jan. 13, 2022 (JP) .................. 2022-003837

(51) Int. Cl.
*G06F 16/11* (2019.01)
*G06F 40/166* (2020.01)

(52) U.S. Cl.
CPC .......... *G06F 16/116* (2019.01); *G06F 40/166* (2020.01)

(58) Field of Classification Search
CPC ...... G06F 16/116; G06F 40/166; G06F 16/88; G06F 16/1794
See application file for complete search history.

(56) References Cited

U.S. PATENT DOCUMENTS

| | | | |
|---|---|---|---|
| 10,831,833 B2 | 11/2020 | Harada et al. | |
| 2003/0097462 A1 | 5/2003 | Parent et al. | |
| 2004/0199876 A1* | 10/2004 | Ethier | G06F 40/117 715/236 |
| 2005/0256874 A1 | 11/2005 | Chiba et al. | |

(Continued)

FOREIGN PATENT DOCUMENTS

| | | | |
|---|---|---|---|
| JP | H11-126201 A | 5/1999 | |
| JP | 3714548 B2 | 11/2005 | |

(Continued)

OTHER PUBLICATIONS

Sep. 30, 2024 Office Action issued in European Patent Application No. 22191428.6.

(Continued)

*Primary Examiner* — Jared M Bibbee
(74) *Attorney, Agent, or Firm* — Oliff PLC

(57) ABSTRACT

An information processing apparatus includes a processor configured to: in compatible change of a first document to a second document in a second format, the first document being generated in a first format, the second format being different from the first format, when the first document contains incompatible data which is not compatible with the second format, convert the incompatible data to data compatible with the second format, and add the converted incompatible data to the second document; and embed link information for the converted incompatible data at a position, in the second document, corresponding to an original position, in the first document, of the incompatible data.

20 Claims, 10 Drawing Sheets

(56) References Cited

U.S. PATENT DOCUMENTS

2007/0076984 A1* 4/2007 Takahashi .......... G06V 30/1444
358/1.9
2015/0095757 A1 4/2015 Kamata

FOREIGN PATENT DOCUMENTS

JP 2010-079850 A 4/2010
JP 6859768 B2 4/2021

OTHER PUBLICATIONS

May 17, 2023 Search Report issued in European Patent Application No. 22191428.6.
Sep. 2, 2025 Office Action issued in Japanese Patent Application No. 2022-003837.

* cited by examiner

FIG. 6A
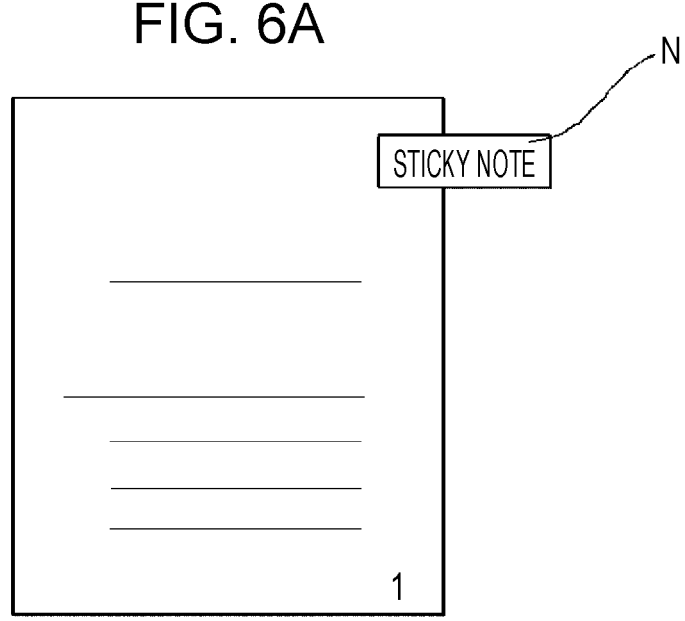
FIG. 6B
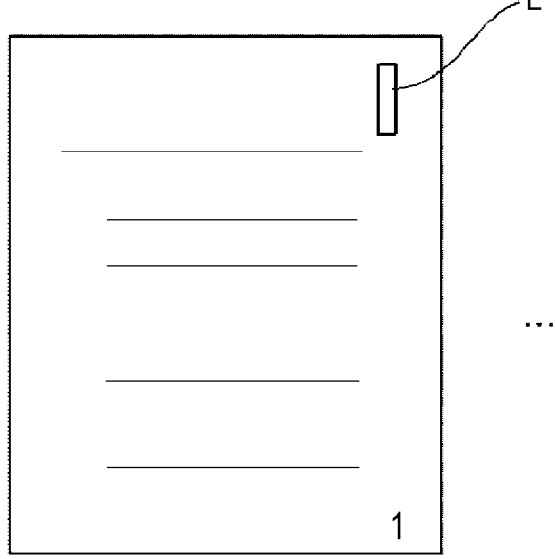
FIG. 6C
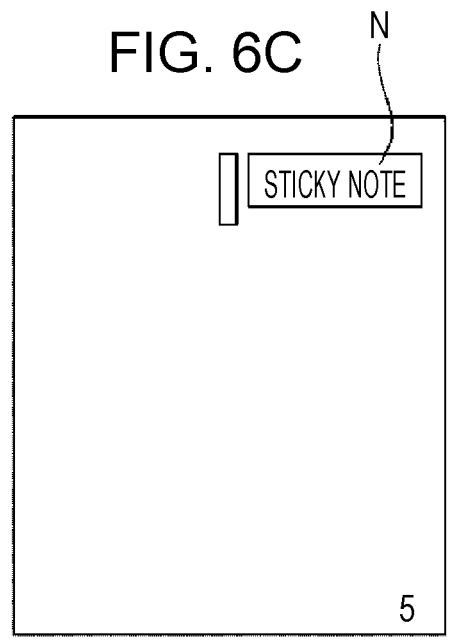

FIG. 8A
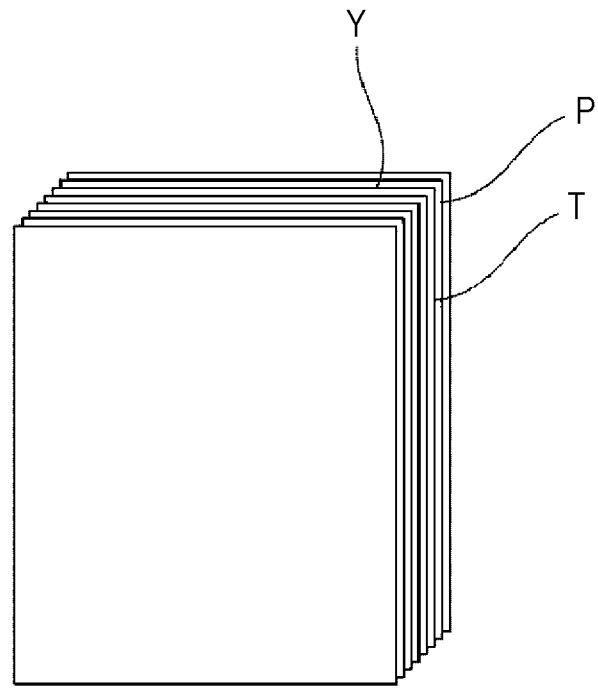
FIG. 8B
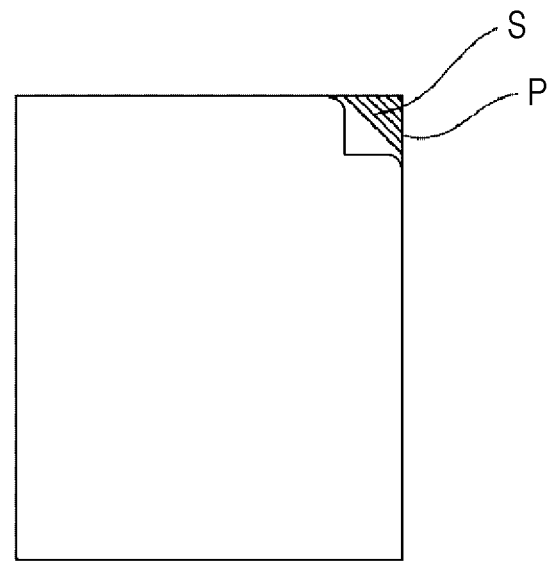

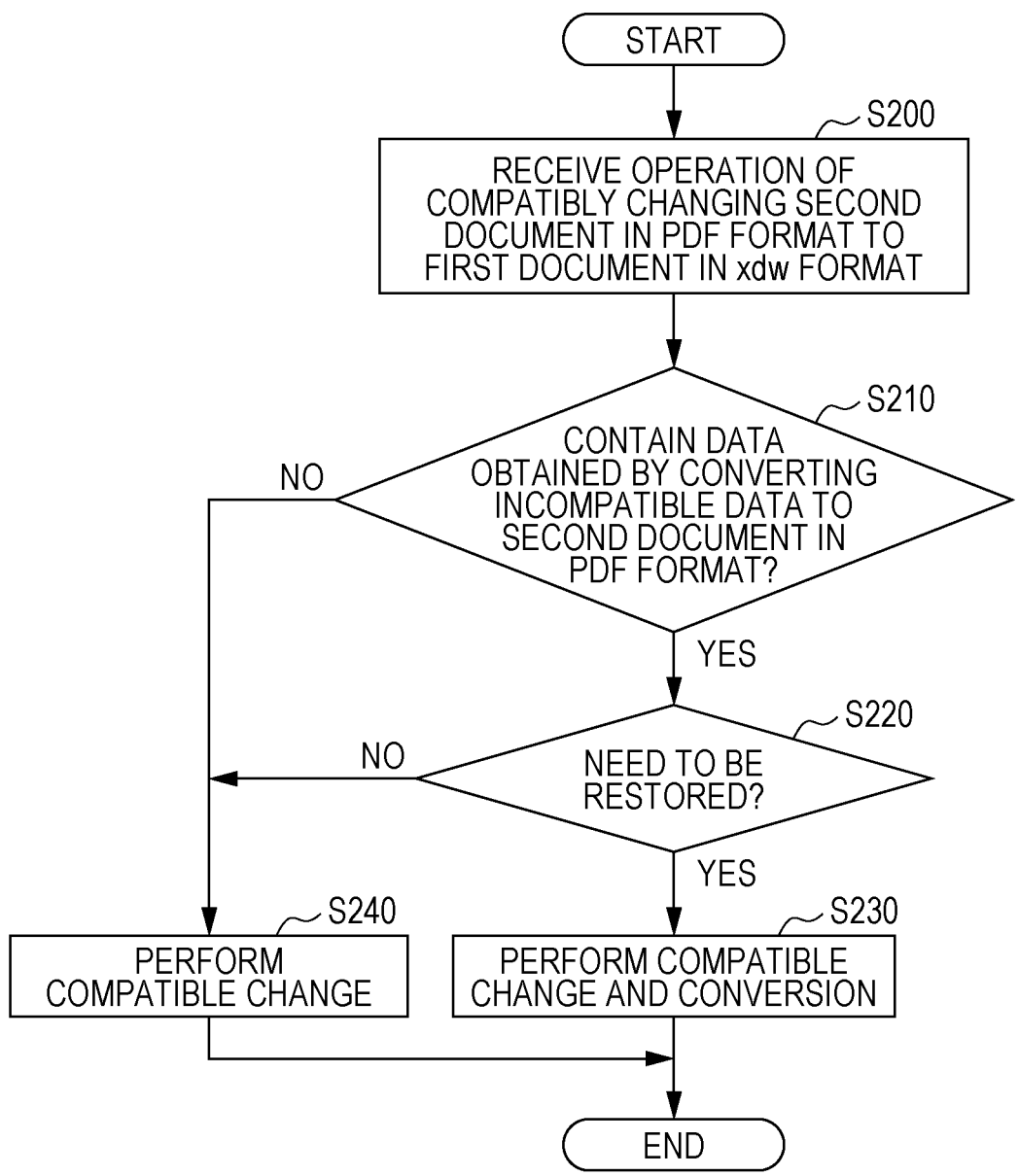

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-003837 filed Jan. 13, 2022.

BACKGROUND

(i) Technical Field

The present disclosure relates to an information processing apparatus, a non-transitory computer readable medium, and an information processing method.

(ii) Related Art

Japanese Unexamined Patent Application Publication No. 2010-79850 discloses an electronic-document conversion system which converts an electronic document to a different format. The electronic-document conversion system includes a document format conversion unit which converts a pre-conversion document 1 to the format of a post-conversion document 2, a document data embedding unit which embeds the pre-conversion document 1 in the post-conversion document 2 as a pre-conversion document 1', and a document format conversion unit which implements inverse conversion from the post-conversion document 2 by generating a document in the pre-conversion format from the pre-conversion document 1' embedded in the post-conversion document 2.

Japanese Patent No. 6859768 discloses an information processing apparatus which includes an acquisition unit and a conversion unit. The acquisition unit acquires information about a browsing program in a terminal on which a document is to be browsed. When the document is not allowed to be browsed on the terminal, the conversion unit converts the document to a format in which the document is allowed to be browsed by using the browsing program. When the terminal is provided with multiple browsing programs, the conversion unit converts the document to a format in which the degree of matching between the content of the pre-conversion document and the content of the post-conversion document is higher. The degree of matching is calculated for figures by using the graphical representation method and the data structure. The degree of matching is calculated for images by using image representation method and the compression method.

Japanese Patent No. 3714548 discloses a computer-aided design (CAD) data file conversion system using a network. The CAD data file conversion system includes a Web server which is capable of mutual communication over the network, and multiple file viewer terminals. The Web server includes a Web server program, a conversion program, and a data file storage device. The data file storage device stores multiple CAD data files whose formats are different from each other. Each file viewer terminal includes a Web browser program and a file browsing-dedicated program. When a file viewer selects any CAD data file stored in the data file storage device, and instructs, from a file viewer terminal, the Web server program of the Web server to convert the selected CAD data file to the format corresponding to the file browsing-dedicated program, the Web server program instructs the conversion program to perform conversion. The conversion program converts the CAD data file, which has been selected in the data file storage device, to the format corresponding to the file browsing-dedicated program. The converted CAD data file is transmitted from the Web server program to the Web browser program. The Web browser program starts the file browsing-dedicated program. Thus, the file viewer may browse the converted CAD data file. The conversion program has a configuration in which, when any CAD data file stored in the data file storage device is selected and an instruction to convert the selected CAD data file to the format corresponding to the file browsing-dedicated program is transmitted, the file viewer may set the format of the conversion by using the Web browser program.

In compatible change of an electronic document to a different file format, the source electronic document in compatible change may contain incompatible data which is not compatible with the different file format which is the compatible-change target. If the electronic document, as it is, is compatibly changed, the incompatible data fails to be contained in the different file format which is the compatible-change target.

In the related art, incompatible data may be converted to similar data. However, in this case, the differentiation between data, which is obtained by compatibly changing compatible data, and data, which is obtained by converting incompatible data, may be unclear.

SUMMARY

Aspects of non-limiting embodiments of the present disclosure relate to an information processing apparatus, a non-transitory computer readable medium, and an information processing method which hold the differentiation between data, which is compatibly changed, and data, which is obtained by converting incompatible data, even when electronic document data, which contains data incompatible with a different file format, is compatibly changed to the different file format.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: in compatible change of a first document to a second document in a second format, the first document being generated in a first format, the second format being different from the first format, when the first document contains incompatible data which is not compatible with the second format, convert the incompatible data to data compatible with the second format, and add the converted incompatible data to the second document; and embed link information for the converted incompatible data at a position, in the second document, corresponding to an original position, in the first document, of the incompatible data.

BRIEF DESCRIPTION OF THE DRAWINGS

Exemplary embodiment of the present disclosure will be described in detail based on the following figures, wherein:

FIGS. 6A to 6C are diagrams for describing an exemplary conversion of incompatible data, according to an exemplary embodiment of the present disclosure;

FIGS. 8A and 8B are diagrams for describing another exemplary conversion of incompatible data, according to an exemplary embodiment of the present disclosure;

FIG. 10 is a flowchart of an exemplary operation of an information processing system according to an exemplary embodiment of the present disclosure.

DETAILED DESCRIPTION

Exemplary Embodiment

Figure 1:
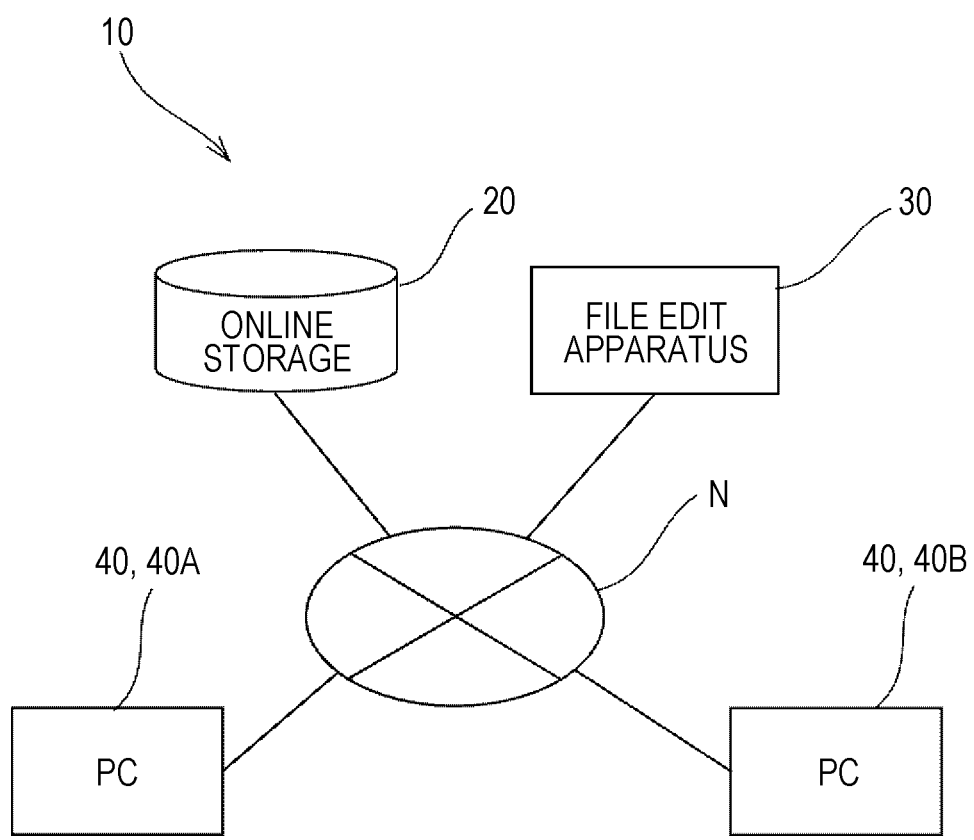
FIG. 1 is a schematic diagram illustrating the configuration of an information processing system according to an exemplary embodiment of the present disclosure.

An exemplary embodiment of the present disclosure will be described below by referring to the drawings. In the drawings, identical or equivalent components and parts are designated with identical reference numerals. The dimensional ratios in the drawings are exaggerated for convenience of description, and may be different from the actual ratios.

By referring to FIG. 1, an exemplary information processing system 10 according to the present exemplary embodiment will be described.

FIG. 1 is a diagram illustrating an exemplary schematic configuration of the information processing system 10 according to the present exemplary embodiment.

As illustrated in FIG. 1, the information processing system 10 according to the present exemplary embodiment includes an online storage 20, a file edit apparatus 30, and personal computers (PCs) 40 (40A, 40B).

Application software, for example, DocuWorks™, which enables at least viewing of a first document generated in a first format, for example, xdw format which is the format of DocuWorks™, is installed in the PC 40A among the PCs 40; application software, which enables at least viewing of a first document generated in the first format, is not installed in the PC 40B. Application software, for example, Acrobat Reader, which enables at least viewing of a second document generated in a second format, for example, in Portable Document Format (PDF) format, is installed in both the PC 40A and the PC 40B. The second format may have a software development kit (SDK) for developers available to the public, and is an open format in which the format may be processed freely.

The online storage 20 is a device in which data such as documents may be stored online.

In accordance with an operation from a PC 40, the file edit apparatus 30 converts a document, which is stored in the online storage 20, to a format, in which the document may be displayed on a WEB browser, or a format, in which the document may be viewed and edited on the PC 40. The file edit apparatus 30 is an exemplary information processing apparatus in the present exemplary embodiment.

The online storage 20, the file edit apparatus 30, and the PCs 40 are connected to each other over a network N. Examples of the network N include the Internet, a local area network (LAN), and a wide area network (WAN).

In the information processing system 10 according to the present exemplary embodiment, when a PC 40 downloads a first document stored in the online storage 20, the file edit apparatus 30 compatibly changes the first document to a second document in a format in which a document may be viewed and edited on the PC 40. The compatible change means that a first document in the first format is converted to a second document in the second format so that the appearance of the first document is the same as or substantially the same as that of the second document. In the compatible change, when the original first document contains incompatible data which is not compatible with the second format, the incompatible data is converted to data compatible with the second format, and the converted data is added to the second document. That is, since the first format and the second format support different data types, compatible change of the file format, as it is, causes incompatible data to be lost. Therefore, the conversion is performed so that incompatible data is transferred to the second document. To do this, the incompatible data is converted to a data type supported by the second format, and the converted data is added to the compatibly-changed second document. Thus, the conversion enables the incompatible data to be transferred to the second document. Incompatible data may be converted so that the appearance of the converted incompatible data is different from that displayed in the first document.

Figure 2:
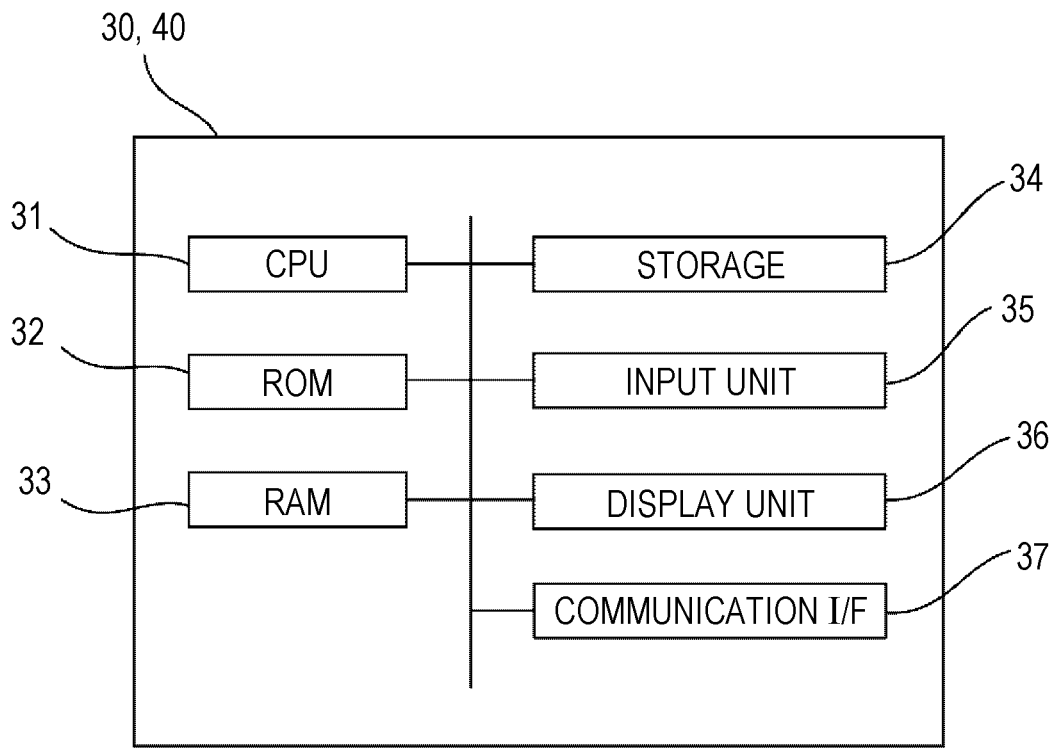
FIG. 2 is a schematic block diagram illustrating a file edit apparatus according to an exemplary embodiment of the present disclosure.

FIG. 2 is a block diagram illustrating the hardware configuration of the file edit apparatus 30 and the PCs 40 according to the present exemplary embodiment. The file edit apparatus 30 and the PCs 40 have a typical computer configuration. Thus, the file edit apparatus 30 will be described as a typified apparatus.

As illustrated in FIG. 2, the file edit apparatus 30 includes a central processing unit (CPU) 31 which is an exemplary processor, a read only memory (ROM) 32, a random access memory (RAM) 33, a storage 34, an input unit 35, a display unit 36, and a communication interface (I/F) 37. The configurations are connected to each other through a bus communicatively.

The CPU 31, which is a central processing unit, executes various programs, and controls the units. That is, the CPU 31 reads programs from the ROM 32 or the storage 34, and executes the programs by using the RAM 33 as a work area. The CPU 31 performs control of the configurations and various types of computation according to the programs recorded in the ROM 32 or the storage 34. In the present exemplary embodiment, the ROM 32 or the storage 34 stores programs.

The ROM 32 stores various programs and various data. The RAM 33, as a work area, stores programs or data temporarily. The storage 34 is formed, for example, of a solid state drive (SSD) or a flash memory, and stores various programs, including an operating system, and various data.

The input unit 35 includes a pointing device such as a mouse and a keyboard, and is used for various input operations. The input unit 35 is used, for example, for input of a message body and input of a condition for extracting a message.

The display unit 36 is, for example, a liquid crystal display. The display unit 36 displays various types of information on the basis of control by the CPU 31. The display unit 36 of the touch panel type may function as the input unit 35.

The communication I/F 37 has a function for performing communication from/to the online storage 20 and the PCs 40. The communication I/F 37 functions as a communication interface which receives/transmits various data from/to the online storage 20 and the PCs 40.

Figure 3:
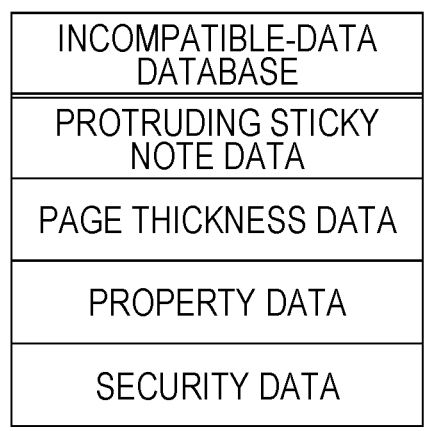
FIG. 3 is a diagram illustrating an exemplary database for incompatible data according to an exemplary embodiment of the present disclosure.

The storage 34 of the file edit apparatus 30 stores a database (incompatible-data database) for incompatible data illustrated in FIG. 3. The incompatible-data database stores predetermined data as data, which is incompatible in compatible change from the first format to the second format due to the standards/specifications of the formats. Therefore, the database may be predetermined in accordance with the source file format and the target file format in the compatible change.

The database for incompatible data illustrated in FIG. 3 has entries, for example, of protruding sticky note data, page thickness data, property data, and security data. As illustrated in FIG. 6A, the protruding sticky note data indicates data of a sticky note displayed so as to protrude from the displayed document data. As illustrated in FIG. 8A, the page thickness data indicates the thickness of the document indicated by document data. Lines indicating the thickness (vertical lines and horizontal lines) have links to their corresponding pages. When a user selects a line, the corresponding page of the document data is displayed. The property data is, for example, data about the properties of document data, such as signature data, document attribute data of resolution and compression format, meta data, and invisible text data which is obtained through optical character recognition (OCR) and which is embedded in document data. The security data is data about security of document data, such as a password and an electronic seal. The incompatible data is not limited to the data illustrated in FIG. 3, and may be other data.

Exemplary operation of the information processing system 10 according to the present exemplary embodiment will be described.

Figure 4:
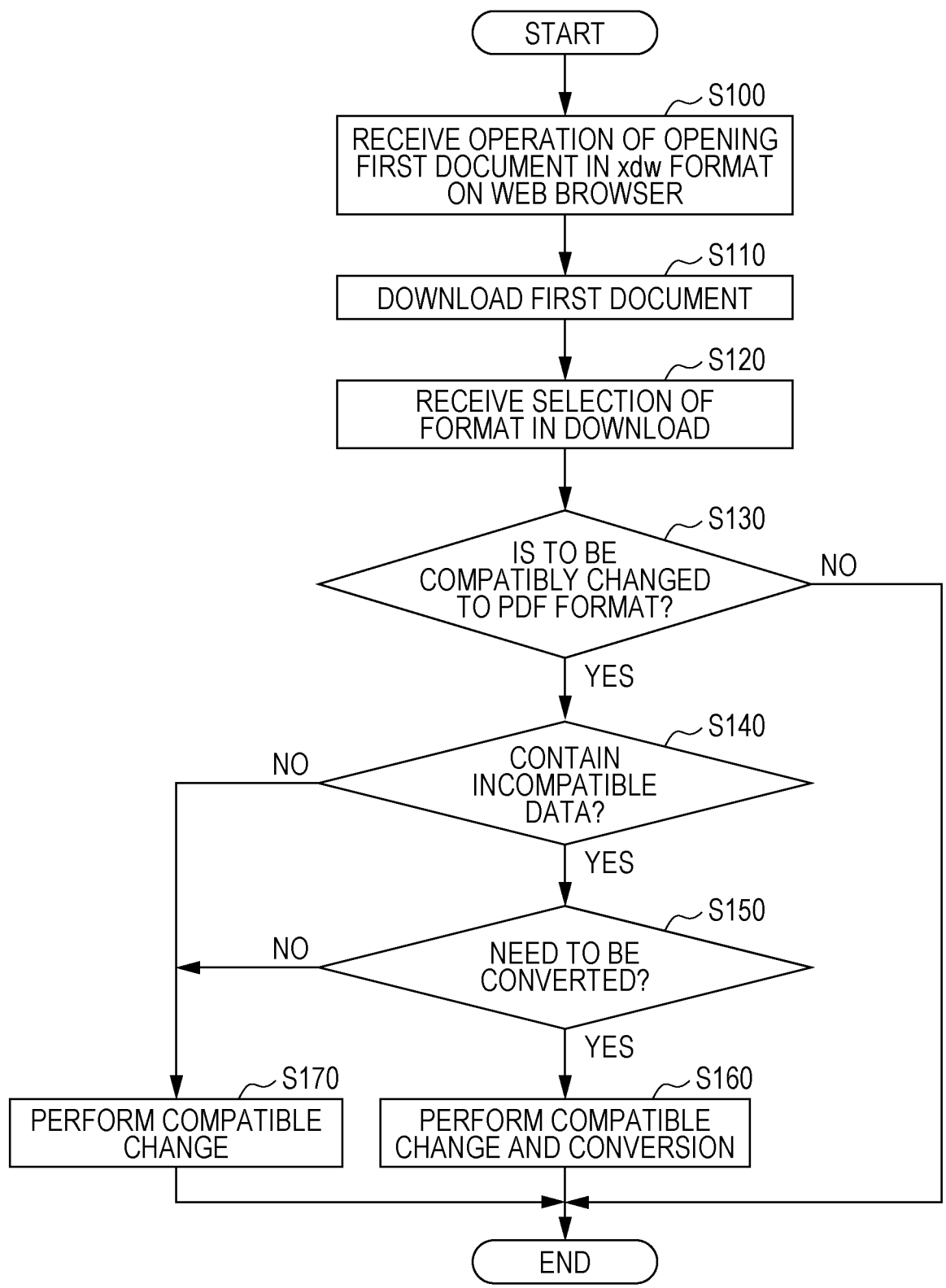
FIG. 4 is a flowchart of an exemplary operation of an information processing system according to an exemplary embodiment of the present disclosure.

FIG. 4 is a flowchart of an exemplary process performed by the CPU 31 of the file edit apparatus 30 when a first document in xdw format which is an exemplary first format is compatibly changed to a second document in PDF format which is an exemplary second format.

In step S100 illustrated in FIG. 4, an operation, which is performed by a user of a PC 40 on a WEB browser and which is for opening a first document in xdw format stored in the online storage 20, is received. Then, the process proceeds to the next step S110.

In step S110, the first document is downloaded to the PC 40. Then, the process proceeds to the next step S120.

In step S120, a format selected in the download performed by the user of the PC 40 is received. The selection is not limited to the case in which the user selects a format manually. The CPU 31 of the file edit apparatus 30 may select a format, for example, by obtaining information about association with the second format, for example, from the registry information of the PC 40. That is, the CPU 31 of the file edit apparatus 30 determines whether application software, which enables viewing and editing of the format of xdw type, has been installed in the download-target PC 40, for example, from the registry information of the PC 40. When the CPU 31 determines that such application software has been installed, the CPU 31 may download the first document, as it is, without compatible change of the first document to PDF format. When the CPU 31 determines that such application software has not been installed, the CPU 31 may convert the first document to PDF format. That is, when the first document is downloaded to the PC 40A in which application software, which enables viewing and editing in the format of xdw type, has been installed, the CPU 31 does not compatibly change the first document to PDF format. When the first document is downloaded to the PC 40B in which application software, which enables viewing and editing of the format of xdw type, has not been installed, the CPU 31 may compatibly change the first document to PDF format. Then, the process proceeds to the next step S130.

In step S130, it is determined whether the format, which has been selected in the download and which is received in step S120, involves compatible change to PDF format. That is, it is determined whether the user has chosen to perform download by compatibly changing the first document in xdw format to a second document in PDF format. If it is determined that the first document is to be compatibly changed to PDF format, the process proceeds to a next step S140.

In contrast, if it is determined that the first document is not to be compatibly changed to PDF format, the process ends. That is, the first document in xdw format, as it is, is downloaded.

In step S140, it is determined whether the first document contains incompatible data (see FIG. 3). If it is determined that the first document contains incompatible data, the process proceeds to a next step S150.

Figure 5:
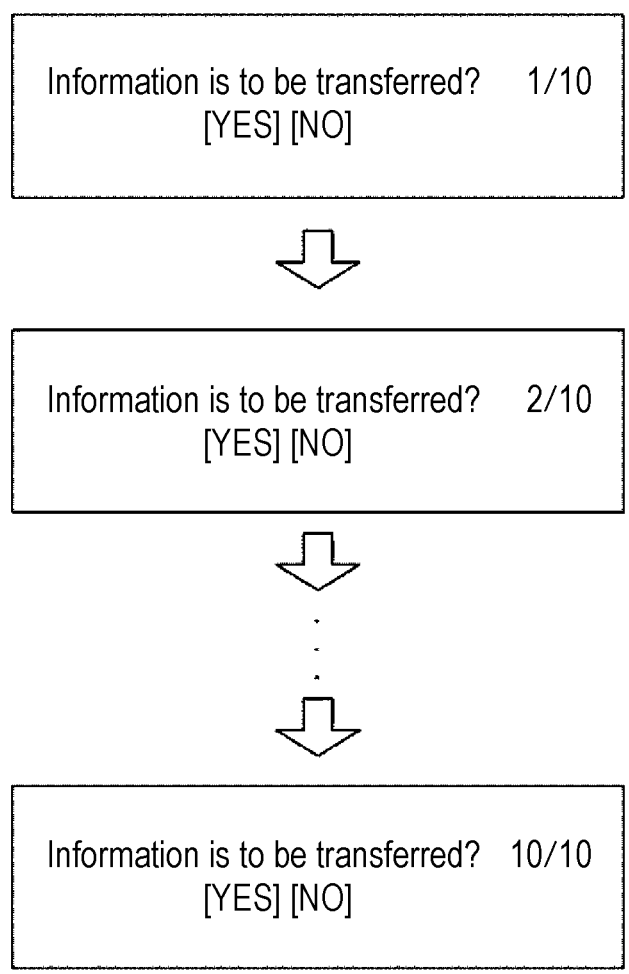
FIG. 5 is a diagram for describing exemplary confirmation screens in conversion of incompatible data, according to an exemplary embodiment of the present disclosure.

In step S150, it is determined whether incompatible data needs to be converted. The user may select whether incompatible data needs to be converted. Specifically, as illustrated in FIG. 5, a message, "Information is to be transferred?" is displayed on the display unit of the PC 40 for each piece of incompatible data in conversion. At that time, display, in which the denominator indicates the number of pieces of incompatible data and the numerator indicates the number of the selected piece of incompatible data (for example, $\frac{1}{10}$), is performed so that the user knows the number of pieces of incompatible data and the number of the piece of incompatible data which is being selected. If the user chooses to transfer the piece of incompatible data, that is, if the piece of incompatible data is to be converted, the user selects "YES". If the user chooses not to transfer the piece of incompatible data, that is, if the piece of incompatible data is not to be converted, the user selects "NO". Selection is performed for all the pieces of incompatible data (ten in the example in FIG. 5). When the user chooses to convert at least one of the pieces of incompatible data, the process proceeds to the next step S160.

In step S160, compatible data is changed compatibly, and incompatible data is converted. That is, compatible data is compatibly changed to the second document in PDF format; incompatible data is converted to data compatible with PDF format, and the converted data is added to the second document.

In contrast, if it is determined that the first document does not contain incompatible data in step S140, or if it is determined that incompatible data is not to be converted in step S150, the process proceeds to step S170. In step S170, the first document in xdw format is compatibly changed to the second document in PDF format. In this case, incompatible data is not transferred to the second document, and is deleted from the second document. Then, the process ends.

Conversion of incompatible data will be described by using FIGS. 6A to 9B.

FIGS. 6A to 6C are diagrams for describing an exemplary case in which incompatible data is a protruding sticky note N.

As illustrated in FIG. 6A, the protruding sticky note N is attached in the upper right portion in the first page of a first document in xdw format. The CPU 31 of the file edit apparatus 30 compatibly changes the first document in xdw format to a second document in PDF format. In the compatibly-changed second document, the incompatible data is converted to data compatible with PDF format, for example, data in an image format. As illustrated in FIG. 6C, the converted data is added to a new page generated in the second document, for example, the last page (the fifth page in the example). As illustrated in FIG. 6B, in the compatibly-changed second document, link information L for the converted incompatible data is embedded at the position, in the second document, corresponding to the position at which the protruding sticky note N is attached in the first document. The link information L contains information for displaying the page when the link information L is selected. When a user selects the link information L, the corresponding page (the fifth page in the example) is displayed.

The second document stores position information about the original position, in the first document, of incompatible data, which is described below. In restoration of the second document in PDF format to the first document in xdw format, the incompatible data is reconstructed by using the position information, and the first document is generated.

Figure 7A:
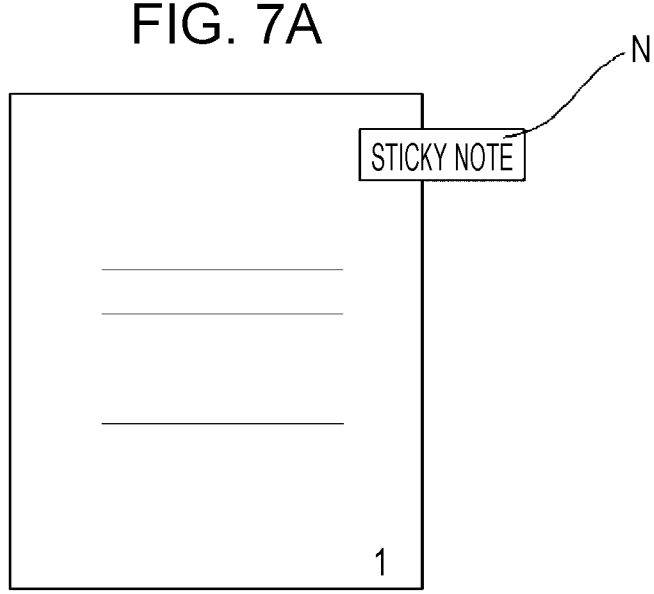
FIGS. 7A to 7C are diagrams for describing another exemplary conversion of incompatible data, according to an exemplary embodiment of the present disclosure.
Figure 7B:
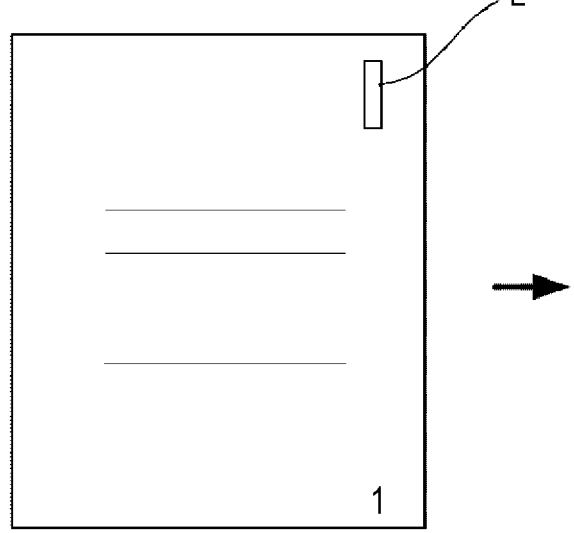
Figure 7C:
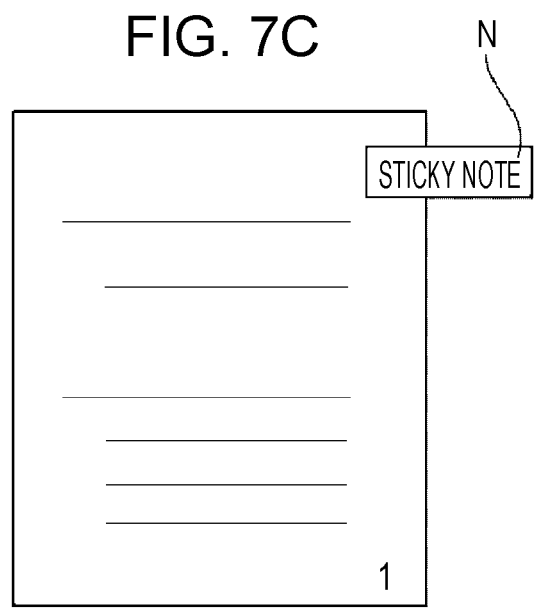

FIGS. 7A to 7C are diagrams for describing another exemplary case in which incompatible data is a protruding sticky note N.

As illustrated in FIG. 7A, the protruding sticky note N is attached in the upper right portion in the first page of a first document in xdw format. The CPU 31 of the file edit apparatus 30 compatibly changes the first document in xdw format to a second document in PDF format. In the compatibly-changed second document, incompatible data is converted to data in an image format which is compatible with PDF format. As illustrated in FIG. 7B, in the compatibly-changed second document, invisible data in the image format is added at the position, in the second document, corresponding to the position at which the protruding sticky note N is attached in the first document. In addition, link information L for the converted data in the image format is embedded. The link information L contains information for displaying incompatible data, which is converted to the image format, as pop-up information when the link information L is selected. When a user selects the link information L, as illustrated in FIG. 7C, the incompatible data, which is converted to the image format, is displayed as pop-up information. That is, before a user's selection of the link information L, incompatible data, which is converted to the image format, is not visible to the user.

FIGS. 8A and 8B are diagrams for describing an exemplary case in which incompatible data is page thickness data P.

As illustrated in FIG. 8A, in the first document in xdw format, vertical lines T and horizontal lines Y representing the page thickness data P indicating the thickness of the first document are displayed. when a user selects the area surrounded by a vertical line T and a horizontal line Y, the corresponding page is displayed. The CPU 31 of the file edit apparatus 30 compatibly changes such a first document in xdw format to a second document in PDF format. In the compatibly-changed second document, as illustrated in FIG. 8B, oblique lines S are added to the top right portion of the second document as the page thickness data P. In addition, for each of the oblique lines S, link information L for the corresponding page is embedded. The link information L contains information for displaying the corresponding page when the link information L is selected. When a user selects the link information L, the corresponding page is displayed.

In the example, the oblique lines S representing the page thickness data P are added in the top right portion of the second document. However, the configuration is not limited to this. Like the page thickness data P in the first document, the page thickness data P may be added by using vertical lines T and horizontal lines Y at the position, in the second document, corresponding to the original position in the first document. Alternatively, the page thickness data P may be added by using only vertical lines T or by using only horizontal lines Y.

Figure 9A:
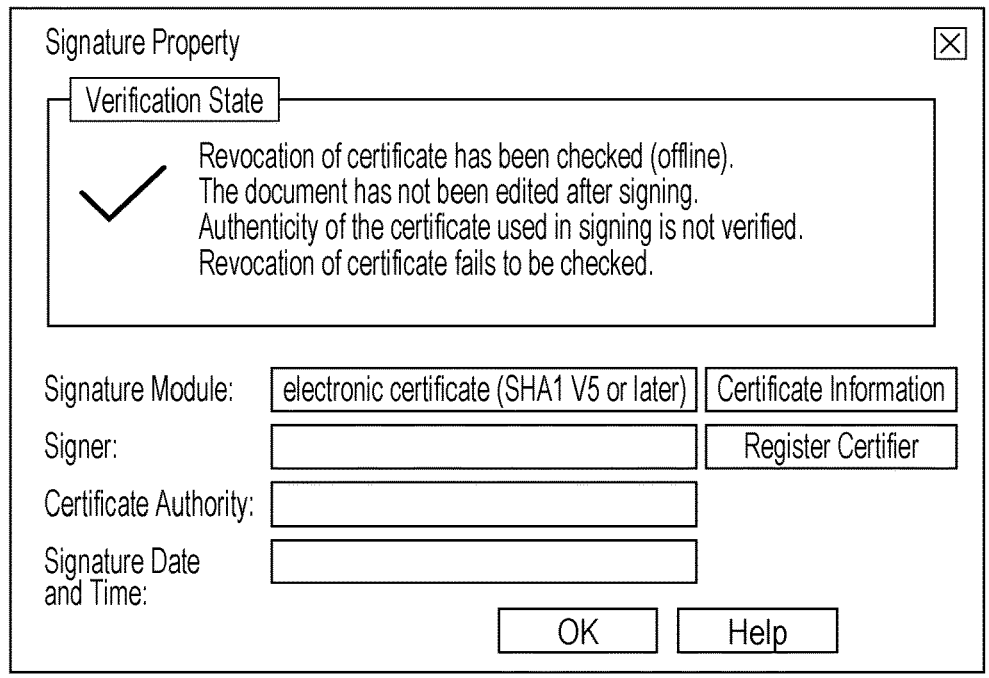
FIGS. 9A and 9B are diagrams for describing another exemplary conversion of incompatible data, according to an exemplary embodiment of the present disclosure.
Figure 9B:
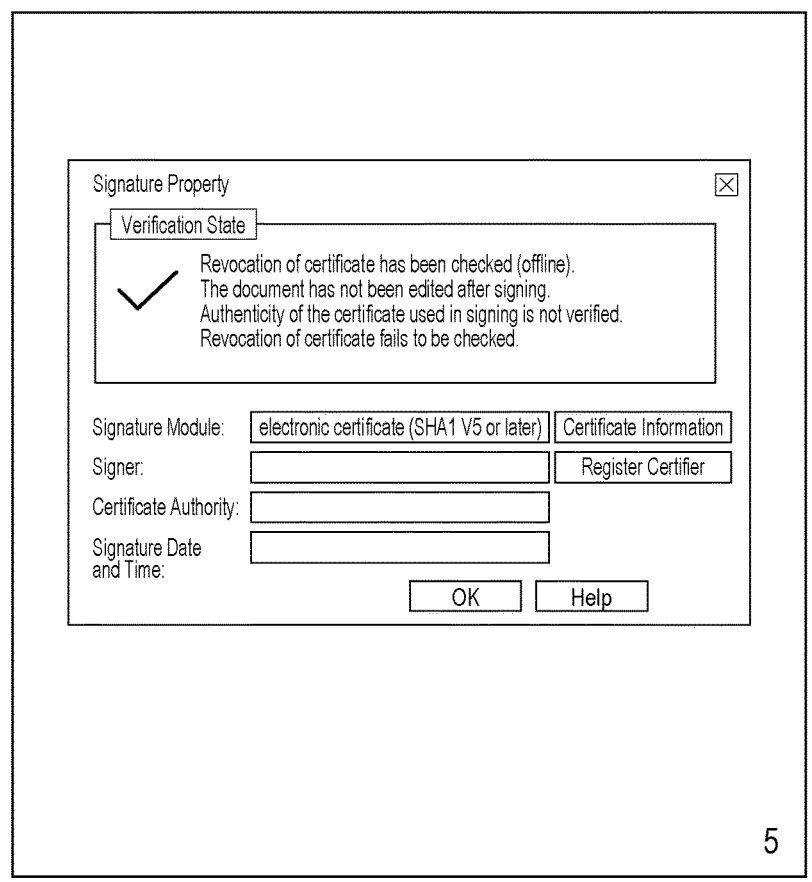

FIGS. 9A and 9B are diagrams for describing an exemplary case in which incompatible data is property data.

As illustrated in FIG. 9A, a first document in xdw format contains signature data of the first document as property data. The CPU 31 of the file edit apparatus 30 compatibly changes such a first document in xdw format to a second document in PDF format. In the compatibly-changed second document, incompatible data is converted to data compatible with PDF format, for example, data in an image format. As illustrated in FIG. 9B, the converted data is added to a new page generated in the second document, for example, the last page (the fifth page in the example). The configuration is not limited to the case in which the converted incompatible data is added to a new page in the second document. Link information L may be added at any position in the second document. When a user selects the link information L, the converted data may be displayed as pop-up information. Alternatively, only text data may be extracted from property data, and the extracted text data may be added to the second document by converting the text data, for example, to a different function compatible with PDF format, such as the annotation function.

FIG. 10 is a flowchart of an exemplary process performed by the CPU 31 of the file edit apparatus 30 when a second document in PDF format, which is an exemplary second format, is restored to a first document in xdw format which is an exemplary first format. The second document has been compatibly changed from the first document in xdw format which is an exemplary first format.

In step S200 in FIG. 10, an operation of compatibly changing from a second document in PDF format to a first document in xdw format is received. Such an operation may be performed on the second document stored in the online storage 20, or may be performed on the second document stored in a PC 40. Then, the process proceeds to the next step S210.

In step S210, it is determined whether the second document in PDF format contains data which has been generated by converting incompatible data. If it is determined that the second document contains converted incompatible data, the process proceeds to a next step S220.

In step S220, it is determined whether the incompatible data needs to be restored. A user may select whether incompatible data needs to be restored. Specifically, in conversion of incompatible data to its original data, a message, "Is information to be restored?" is displayed on the display unit of a PC 40 for each piece of incompatible data. At that time, display, in which the denominator represents the number of pieces of incompatible data and the numerator represents the number of the selected piece of incompatible data (for example, ⅒), is made so that the user knows the number of pieces of incompatible data and the number of the piece of incompatible data which is being selected. When a user chooses to perform restoration, that is, when the incompatible data is to be converted, the user selects "YES". When the user chooses not to perform restoration, that is, when incompatible data is not to be converted, the user selects "NO". Selection is made for all the pieces of incompatible data. When the user chooses to convert at least one of the pieces of incompatible data to its original state, the process proceeds to a next step S230.

In step S230, the compatible data is restored, and incompatible data is converted to its original state. That is, compatible data is compatibly changed to the first document in xdw format, and incompatible data is reconstructed in xdw format. Thus, the first document is generated. That is, in conversion of incompatible data to PDF format, the second document stores position information about the original position, in the first document, of the incompatible data. In restoration from the second document in PDF format to the first document in xdw format, incompatible data is reconstructed by using the position information, and the first document is generated. The position information contains information, such as the page, the line, the coordinates, and the like of the first document. Then, the process ends.

In contrast, if it is determined that the second document does not contain incompatible data in step S210, or if it is determined that incompatible data does not need to be restored in step S220, the process proceeds to step S240. In step S240, the second document in PDF format is compatibly changed to the first document in xdw format. In this case, even when the second document has incompatible data, the incompatible data is not restored in the first document, and is deleted from the first document. Then, the process ends.

The present disclosure is not limited to the embodiment described above. Various changes and applications may be made in the scope without departing from the gist of the present disclosure.

The configuration is not limited to the case of compatible change from the first format to the second format in download of a first document from the online storage 20. For example, the CPU of a PC 40 may compatibly change or convert a first document in the first format, which is stored in the storage of the PC 40, to a second document in the second format. In this case, the PC 40 is an exemplary information processing apparatus.

The link information L may contain information for starting application software, which enables editing in the first format, in the state in which incompatible data may be edited, when the link information is selected. That is, the link information L may be configured so that, for example, object linking and embedding (OLE) is used to start DocuWorks™ which enables editing of a first document in xdw format. After a user edits the first document in xdw format, the edit result may be reflected to the second document in PDF format.

Figure 11:
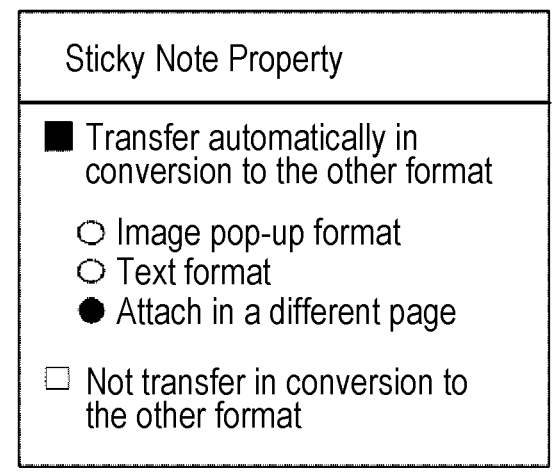
FIG. 11 is a diagram for describing an exemplary setting screen for conversion of incompatible data, according to an exemplary embodiment of the present disclosure.

In the exemplary embodiment described above, in conversion of incompatible data, a message, "Is information to be transferred?" is displayed on the display unit of a PC 40 for each piece of incompatible data (see FIG. 5), and a user's selection is received. However, the configuration is not limited to this. Whether incompatible data is to be converted may be selected in advance before conversion. For example, in the example in FIG. 11, for the protruding sticky note N, an option, "Transfer automatically in conversion to the other format", and an option, "Not transfer in conversion to the other format", are available. In addition, in the example in FIG. 11, how to add incompatible data, such as "Image pop-up format" which is a format in which converted incompatible data is displayed by using a pop-up image as illustrated in FIG. 7C, and "Attach in a different page" which is a format in which the converted incompatible data is added to the last page as illustrated in FIG. 6C, may be selected in advance.

In the exemplary embodiment, the form, in which programs are stored (installed) in advance in a ROM or a storage, is described. However, the configuration is not limited to this. The programs may be provided by recording the programs in a recording medium, such as a compact disk read only memory (CD-ROM), a digital versatile disk read only memory (DVD-ROM), or a Universal Serial Bus (USB) memory. Alternatively, the programs may be downloaded from an external apparatus over a network.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
in compatible change of a first document to a second document in a second format, the first document being generated in a first format, the second format being different from the first format, when the first document contains incompatible data which is not compatible with the second format, convert the incompatible data to data in a third format that is separate from the first format or the second format and is compatible with the second format, and add the converted incompatible data to the second document; and
embed link information for the converted incompatible data at a position, in the second document, corresponding to an original position, in the first document, of the incompatible data.

2. The information processing apparatus according to claim 1,
wherein the processor is configured to:
in storage of the first document in an external apparatus, when application software is installed in the apparatus in which the first document is to be stored, the application software enabling at least viewing of the first document, cause the first document not to be compatibly changed to the second format, and, when the application software is not installed, cause the first document to be compatibly changed to the second format.

3. The information processing apparatus according to claim 1,
wherein the converted incompatible data is added to a new page generated in the second document, and
wherein the link information contains information for displaying the page in response to selection of the link information.

4. The information processing apparatus according to claim 2,
wherein the converted incompatible data is added to a new page generated in the second document, and
wherein the link information contains information for displaying the page in response to selection of the link information.

5. The information processing apparatus according to claim 1,
wherein the converted incompatible data is added in an invisible image format at the position, in the second document, corresponding to the original position, in the first document, of the converted incompatible data, and
wherein the link information contains information for displaying the converted incompatible data, which is converted to the image format, as pop-up information in response to selection of the link information.

6. The information processing apparatus according to claim 2,
wherein the converted incompatible data is added in an invisible image format at the position, in the second document, corresponding to the original position, in the first document, of the converted incompatible data, and
wherein the link information contains information for displaying the converted incompatible data, which is converted to the image format, as pop-up information in response to selection of the link information.

7. The information processing apparatus according to claim 1,
wherein the link information contains information for, in response to selection of the link information, starting edit application software in a state in which the incompatible data is capable of being edited, the edit application software enabling editing in the first format.

8. The information processing apparatus according to claim 2,
wherein the link information contains information for, in response to selection of the link information, starting edit application software in a state in which the incompatible data is capable of being edited, the edit application software enabling editing in the first format.

9. The information processing apparatus according to claim 1,
wherein the processor is configured to:
enable selection of whether the incompatible data is to be converted.

10. The information processing apparatus according to claim 2,
wherein the processor is configured to:
enable selection of whether the incompatible data is to be converted.

11. The information processing apparatus according to claim 3,
wherein the processor is configured to:
enable selection of whether the incompatible data is to be converted.

12. The information processing apparatus according to claim 4,
wherein the processor is configured to:
enable selection of whether the incompatible data is to be converted.

13. The information processing apparatus according to claim 5,
wherein the processor is configured to:
enable selection of whether the incompatible data is to be converted.

14. The information processing apparatus according to claim 6,
wherein the processor is configured to:
enable selection of whether the incompatible data is to be converted.

15. The information processing apparatus according to claim 9,
wherein the selection is performed in the conversion.

16. The information processing apparatus according to claim 9,
wherein the selection is performed in advance before the conversion.

17. The information processing apparatus according to claim 1,
wherein the processor is configured to:
in restoration of the second document in the second format to the first document in the first format, reconstruct the incompatible data and generate the first document.

18. The information processing apparatus according to claim 17,
wherein the processor is configured to:
in compatible change of the first document including the incompatible data to the second document in the second format, store position information about the original position, in the first document, of the incompatible data; and
in restoration of the second document in the second format to the first document in the first format, reconstruct the incompatible data from the position information, and generate the first document.

19. A non-transitory computer readable medium storing a program causing a computer to execute a process comprising:
in compatible change of a first document to a second document in a second format, the first document being generated in a first format, the second format being different from the first format, when the first document contains incompatible data which is not compatible with the second format, converting the incompatible data to data in a third format that is separate from the first format or the second format and is compatible with the second format, and adding the converted incompatible data to the second document; and embedding link information for the converted incompatible data at a position, in the second document, corresponding to an original position, in the first document, of the incompatible data.

20. An information processing method comprising:

in compatible change of a first document to a second document in a second format, the first document being generated in a first format, the second format being different from the first format, when the first document contains incompatible data which is not compatible with the second format, converting the incompatible data to data in a third format that is separate from the first format or the second format and is compatible with the second format, and adding the converted incompatible data to the second document; and embedding link information for the converted incompatible data at a position, in the second document, corresponding to an original position, in the first document, of the incompatible data.

* * * * *